United States Patent [19]

Koblitz

[11] 3,966,479
[45] June 29, 1976

[54] DENTAL INVESTMENT MATERIAL
[75] Inventor: Francis Frederick Koblitz, York, Pa.
[73] Assignee: Dentsply Research & Development Corporation, Milford, Del.
[22] Filed: Feb. 27, 1973
[21] Appl. No.: 336,393

[52] U.S. Cl............................ 106/38.5 R; 106/109; 106/111
[51] Int. Cl.² ............................................. B28B 7/28
[58] Field of Search .......... 106/114, 115, 35, 38.23, 106/38.3, 38.35, 38.5 R, 38.5 P, 109, 110, 111

[56] References Cited
UNITED STATES PATENTS

| | | | |
|---|---|---|---|
| 1,230,297 | 6/1917 | Hite | 106/114 X |
| 2,188,199 | 1/1940 | Care | 106/115 |
| 3,219,112 | 11/1965 | Sauber | 106/115 X |

FOREIGN PATENTS OR APPLICATIONS

| | | | |
|---|---|---|---|
| 276,457 | 7/1967 | Australia | 106/115 |
| 903,047 | 8/1962 | United Kingdom | 106/115 |

Primary Examiner—Helen M. McCarthy
Assistant Examiner—John P. Sheehan

[57] ABSTRACT

A dental investment material comprising a modified calcium sulfate which when hydrated possesses unique fracture properties of particular advantage when the material is used as a composition for making molds particularly for use in the lost wax process.

2 Claims, No Drawings

DENTAL INVESTMENT MATERIAL

This invention relates to a novel gypsum based mold making and molding composition and more particularly to a composition suitable for use in dental applications where form retention and low fracture strength under compression are important.

DESCRIPTION OF THE PRIOR ART

Gypsum plaster as described in various patents is generally modified to provide specific desirable characteristics such as by the addition of carboxymethyl cellulose as a set inhibitor in U.S. Pat. No. 3,223,082; by the addition of extenders such as talc, asbestos and silica, the addition of wetting agents and the addition of sodium chloride as shown in U.S. Pat. No. 2,753,608. Even more specifically in U.S. Pat. No. 3,369,915 conventional gypsum, water and an anionic surfactant were used to produce a plaster having an especially high compressive strength desirable in the plaster board industry.

The foregoing art, as well as the general gypsum patent art, which is extensive, including U.S. Pat. Nos. 3,393,116, 2,639,478, 2,494,403 and others, describe the calcium sulfate hemihydrate which forms the basis for gypsum products by both its crystal structure as well as its particularly useful compositions.

It can be seen from the examination of the art in this area that gypsum products generally have been produced which possess good mold making characteristics as well as high compressive strength and most attempts at improving these compositions seem to point in a direction of providing higher compressive strengths while modifying the surface characteristics of the material in a manner which would enhance its use as a mold. Many mold applications while needing the surface characteristics of these materials would be improved if lower fracture strength were available. It was thought that a more desirable approach to gypsums used as mold making materials would be to develop a composition which retained the desirable surface characteristics and form defining characteristics of gypsums generally with a material which was less brittle, more easily workable and which generally exhibited less fracture strength under compression than the relatively hard, brittle gypsum product of the art.

DESCRIPTION OF THE INVENTION

It has been learned that when a gypsum-based composition comprising calcium sulfate hemihydrate capable of curing by hydration is extended by the addition of a material capable of holding a weight of water at least equal to the weight of the added filler or extender, and these materials are mixed together with a compatible water dispersible binder capable of promoting adhesion of the filler or extender to the calcined gypsum and cured by the addition of water to hydrate the calcium sulfate hemihydrate, then all of these constituents uniquely combine to promote the formation of a rigid, dimensionally stable product having a crystal structure modified in a manner which produces a controlled reduction in the fracture strength of the final set composition under compression. In addition, the function of the binder in the composition of the present invention in serving to promote the adhesion of the filler or extender to the propagating crystal structure of the gypsum does so without significantly retarding the set or setting time of the material.

The final set product exhibits a unique physical structure comprising essentially randomly oriented crystals of hydrated calcium sulfate hemihydrate with the selected binder sorbed onto the surface of the crystal in a manner which enhances the adherence of the extender to the crystal structure developed during the set or setting (hydration) of the calcium sulfate hemihydrate. This unique adherence of the extender permits this material to retain a weight of water at least equal to the weight of the added extender inside the crystal structure of the set gypsum-based product. Contrary to the teachings of the art the retained water in the solid gypsum matrix is not detrimental to the physical properties of the material when used as a mold or mold making composition but rather serves to promote a dimensional stability and low expansion on set in the composition which is better suited to its end use.

The advantages obtained by the composition of the present invention are achieved by using a calcium sulfate hemihydrate (gypsum) which can be either the alpha or beta type of calcined gypsum. The preferred extender used in the composition of the present invention is diatomaceous earth or perlite preferably of a particle size greater than 5 and less than 44 microns, which size can be obtained by using a material which passes a 325 mesh sieve with fines removed by air classification. The preferred binder of the present invention can be either a starch such as cornstrach or carboxymethyl cellulose or any other binder which will generally in the concentrations disclosed produce the desired effect.

The following approximate composition is typical of formulations which produce the results described herein.

| | |
|---|---|
| Model Plaster (calcium sulfate hemihydrate-modified plaster of paris | 60 – 85% |
| Cornstarch | 5 – 15% |
| Celite 499 (diatomaceous earth) | 7 – 14% |
| Carbowax 6000 (polyethylene oxide) | 1 – 2% |
| Sodium Chloride | 1% |
| Anionic Surfactant | 0.3% |
| Color (optional) | 0.3% |
| Flavor (optional) | .01% |

The following are examples of compositions which are useful in achieving the preferred results of low expansion, good form retention and a fracture strength under compression of less than 500 psi.

EXAMPLE I

An investment powder was compounded and utilized as shown below and the following properties were determined in the composition and set composition:
 a. An aroma reminiscence of mouthwash and antiseptic.
 b. A dry, pourable powder with:
   1. a bulk density of 53 pounds per cubic foot;
   2. a fineness, where there is a 1% retention on a 100 mesh screen and an 8% on a 200 mesh screen, i.e., 90% passes 200 mesh.
 c. A setting expansion of 0.2%.
 d. A smooth hard set surface.
 e. A rapid release of air from the liquid mixture after the addition of water.

f. A storage stability under temperature conditions ranging from 0°C to 40°C over an eighteen month test period.

g. A mixing and work time of 5½ minutes (mixing ratio: 100 weight parts of powder to 90 weight parts of water).

h. A set time to initial hardness — 11 minutes.

i. A set to workability — 15 minutes.

j. A resistance to change when immersed in bulk into boiling water of approximately 20 minutes.

k. An ability to be friable by hand pressure after set.

The constituents of the dry powder composition comprised 73.69% by weight plaster of paris ($CaSO_4 \cdot \frac{1}{2}H_2O$); 8.7% by weight cornstarch (the type known as PF, product of American Maize Co.); 14.5% by weight of diatomaceous earth (the grade known as Celite 499, product of Johns-Manville Company); 1.5% by weight of a polymer known as Carbowax 6000 (pharmaceutical grade, product of Union Carbide Company); 1.0% by weight powdered sodium chloride; 0.3% by weight of a blue pigment; 0.3% by weight sodium octyl sulfosuccinate wetting agent; 0.01% by weight mouthwash flavorant. The dry constituents were mixed together in the following manner, first a preblend was prepared by ball milling the blue pigment into the plaster of paris and added to a second preblend prepared from the remaining ingredients by mixing in a twin shell blender. The plaster of paris and pigment preblend was added to the second preblend in the twin shell blender followed by intensive mixing for 1 hour.

EXAMPLE II

A slow thickening, low viscosity denture base composition was prepared for use in constructing and processing dentures by the method known to dental laboratory technicians as the fluid denture technique. Construction of dentures by the fluid denture resin process was undertaken, using the investment of Example I. The following steps constituted the procedure:

A wax try-in denture, known as a wax-up, which had been duplicated from a denture in service in a patient's mouth was sealed to a dental stone model, known as a cast, of the patient's mouth. The same procedure was followed for both a complete maxillary and complete mandibular denture. Each cast was trimmed to provide a taper of about 5° from the base occlusally toward the land area. The land in each case was ⅛ inch wide. Visible and invisible wax films were removed from the artificial teeth in the wax-up of the dentures by washing the wax-ups with detergent and water. In each case the cast was attached with wax to the inside surface of the lid of a paper cup (16 oz. size), the wax dentures were sprued at their highest points with sprue wax to provide a passage after wax boil-out to vent air and to promote the flow of fluid denture resin to be used later to replace the wax. For example, for the upper denture there were three sprues approximately parallel and horizontal, one at each tuberosity area and one at the midline of the palate at the postdam area. For the lower complete denture, only two sprues were used, one at the high point of the wax-up at each heel area. The sprues extended to within about ¼ inch of the edge of the lid. The sprues were tapered to ¼ inch thick at their junction with wax-up. They were ½ inch overall diameter. The bottom was cut out of the paper cup. The resulting sleeve was inverted and coupled to the lid on which the wax-up was mounted. 200 grams of investment powder (Example I) was mixed with 180 grams of water in a rubber mixing bowl and hand spatulated one minute. The investment was poured into the paper cup while it was vibrating on a dental laboratory vibrator. When the pouring was completed, vibration was continued an additional 30 seconds to promote the escape of air bubbles from the mixture. The investment was allowed 15 minutes to harden after pouring. The paper cup was removed from the hardened investment. A flat surface was cut on the anterior rim so the invested denture could be positioned vertically with the sprues upward. The investment was trimmed away from the base of the cast to form a ⅛ inch V groove around the cast. The investment was trimmed at the sprue holes to form funnel-shaped openings. The invested wax-up was submerged 5 minutes in boiling water to soften the wax and then removed to the benchtop. The cast was carefully extracted from the investment. The remaining wax was rinsed away from both cast and investment with clean boiling water. Both were brushed with a detergent-water paste using a soft squirrel hair brush. This was followed by a boiling water rinse. Two ounces of a water base release agent was poured into a small paper cup. As soon as the surface moisture had drained and evaporated from the cast, the release agent was brushed on in a liberal smooth coat. The cast was propped up vertically to drain off excess release agent and rinsed with cool water. The inside of the investment was similarly treated with release agent. It was flowed into the interproximal areas without brushing to avoid locking air bubbles in narrow spaces. The inside of the sprue holes was coated liberally. The excess release agent was drained out the sprue holes. The release agent was rinsed from the tooth surfaces, pins, and diatoric retention areas of the artificial teeth with a gentle flow of water. The cast and the investment were submerged in cool water for twenty minutes. The cast and the investment were removed from the water and drained free of surface water. The cast was reassembled into the flask by inserting it evenly and firmly onto its land area in the investment. It was secured in position with rubber bands. A 50 mm diameter jar lid was slipped beneath the rubber bands on the cast to increase the pressure of the cast into the investment. The low viscosity denture base composition comprising 22.5 g of modified methylmethacrylate polymer powder and 13 mm of a polymer modified methylmethacrylate monomer liquid capable of polymerizing with the polymer powder to form a high strength denture base was stirred gently in a mixing cup for fifteen seconds. The polymer-monomer composition used for this Example is the subject of a copending application of the same inventor filed on even date herewith. The mixture was allowed to stand an additional fifteen seconds without stirring to release air bubbles. The investment was held in one hand and tilted so that the sprues and the cast were upward while pouring the mixture continuously down a side sprue until the investment was half full. The investment was rocked gently and slowly from side to side to dislodge air bubbles from the interproximal spaces between the teeth. The remainder of the mixture was poured into the same sprue hole until the mixture filled all the sprues. The investment was positioned vertically on the bench on its flattened edge for 5 minutes adding additional denture resin mixture to keep the sprues full. It was then transferred to a pressure cooker containing tap water at 60°C. It was immersed to within 1 inch of the sprue openings. The denture was retained in the pressure cooker thirty minutes under an air pressure of 20 psi. The temperature was maintained at 60°C. by presetting the pressure cooker thermostat to the appropriate setting. The investment was removed from the pressure pot and immersed in room temperature water for 15 minutes. The investment was removed from the cured denture by slicing it with a plaster knife and breaking it away by hand pressure. The sprues were ground off, the resulting denture on the cast was returned to a previously prepared articulator to confirm that the artificial teeth were in correct occlusion. Following this, both the maxillary and mandibular dentures were removed from their casts, polished, and immersed in tap water for storage.

The denture surfaces showed exact reproduction of the fine detail of the original. Air bubbles or pockets in the denture base and flashing on the artificial teeth normally encountered in fluid denture preparations were completely absent. The shrinkage permitted by the conventional hydrocolloid based investments was entirely eliminated by the rigid investment of the present invention.

EXAMPLE III

Following the procedure of Example II, four additional maxillary dentures were constructed from duplicates of the same try-in denture used in Example II. Materials used were:

a. Pour-n-Cure fluid denture base resin (product of Coe Laboratories) with a manufacturer's recommended mixing ratio of 30 ml of powder to 15 ml of liquid.

b. Auto-Cure self-curing acrylic denture resin (product of The L. D. Caulk Company, Division of Dentsply International Inc.), mixing ratio was changed to 21.5 g of powder to 13 ml of liquid.

c. Duraflow Porit fluid denture resin (product of Myerson Company) with a manufacture's recommended mixing ratio of 21.5 g to 12 ml of liquid.

d. Lucitone heat curing denture resin (product of The L. D. Caulk Company, Division of Dentsply International Inc.) mixing ratio changed to 21.5 g to 13 ml of liquid. The liquid used in each of the above cases was the one provided by the manufacturer for use with his own product. Processing was identical to Example I. This procedure produced hard smooth surfaced dentures with the exception of Lucitone which was only partially cured. Lucitone is normally processed at 160° for extended cure time.

EXAMPLE IV

The investment composition of Example I was made first with and then without the addition of the polyoxyethylene polymer component. The composition prepared without the polyoxyethylene polymer still performed adequately but lacked the rapid dispersibility and rapid air release characteristic of the investment of Example I. In general, it was not as creamy and did not exhibit as good a suspension or dispersion of the powder in water as the composition prepared with the polyoxyethylene polymer component.

EXAMPLE V

The investment composition of Example I was made substituting bentonite clays, and tested for substitutes for the addition of the Celite 499 (diatomaceous earth). These compositions performed adequately but did not match the water holding and generally good suspension characteristics of Celite 499.

EXAMPLE VI

The investment composition of Example I was prepared substituting a vinyl acetate powder (Vinac RP 251) for an equal amount of the Celite 499. This material is commonly used in concrete and plaster compositions. This vinyl acetate polymer and similar polymers, in general, promoted adherence of the investment to the denture. This was very objectionable because it required additional cleaning and polishing to obtain a finished denture.

EXAMPLE VII

The investment composition of Example I was again prepared, this time using several different grades of diatomaceous earth tested as the equivalent for Celite 499. These included several Dicalite brand materials and other Johns-Manville products, Celite 281, Snowflake and Superfloss.

Although these compositions were functional they again did not produce all the superior properties produced by the Celite 499. Celite 281, however, was substantially equivalent to Celite 499. Celite 281 is said by the manufacturer to be equivalent to Celite 499, excepting for a somewhat wider particle size range.

EXAMPLE VIII

Following the procedure of Example II, a wax model head sculpture was duplicated in acrylic plastic, later to be appropriately finished for surface texture and color details.

EXAMPLE IX

Following the procedure of Example II, two wax models were converted to plaster and lightweight statues by substituting in one, plaster of paris, and the other, the investment of this invention for the acrylic polymer of Example II. In fashioning a statue from this investment, the investment was mixed at the ratio of 200g powder to 180g water. However, on pouring it into the prepared mold (boiled out and coated with a release agent), it was poured slowly while vibrating the mold to assist the release of air from undercut areas of the mold. After hardening overnight, the mold was carefully broken away, and the duplicated statue carefully washed free of release agent. The statue was allowed to stand several days to gradually lose its interior moisture through evaporation. It was then lacquered and colored to produce life-like detail, the final article being easily portable with only about 70% of the weight of the simultaneously prepared duplicate plaster statue.

Of the material found capable of holding an amount of water equal to the weight of the added water holding material, Celite 499 provided the most superior characteristics in the finished product. This material is described by its manufacturer (Johns-Manville Corporation) as being a diatomaceous silica with an especially high silica content (as much as 94%). Included in the diatomaceous earth is 3% to 4% of combined water and an average of 4% free moisture. The water or other vehicle holding capacity of Celite 499 is ascribed by the manufacturer to the fact that 93% of its apparent volume consists of interconnected pores or voids of the proper diameter for the holding of solvent, polymer molecules, and combined water. This is fully taken advantage of in the practice of the present invention by the use of a binder material which holds the diatomaceous earth in suspension in the calcium sulfate composition during the hydration and set in a manner which helps to control the final internal structure of the material and give it its final properties. Celite 499 differs from Celite 281 by being specially classified to achieve a uniform particle size distribution without oversize aggregates. The size of its particles characteristically contains 99.8% of the particles being a size smaller than 44 microns.

In place of the polyoxyethylene polymer suspending agent and the anionic wetting agent, other wetting agents have utility in the present invention if used in an amount low enough to prevent softening of the finished investment.

The fragrance and the blue pigment in the composition of the present invention are added to enhance the pleasantness of working with the investment and to provide product distinctiveness.

In discussing the use of any gypsum base product, it is necessary to include a discussion of the incorporation of certain accelerators into such compositions. Incorporation of these materials is well-known and is referred to in the prior art already referred to herein. The preferred amount of sodium chloride in the composition should be in the range of from about ¼% to about 2% with the preferred normal range being around 1%. The requirement of the accelerator in combination with the calcium sulfate hemihydrate is to achieve simultaneously a working time in the range of about 5 minutes and a set time in the range of about 11 minutes. Generally speaking, a retarder is not required, but in large scale manufacture, it is preferred to achieve lot to lot uniformity of properties by appropriately testing each large lot during manufacture, adding very small quantities of retarder to correct minor variations in pour and set time.

Materials which can be used in place of the Carbowax 6000 and cornstarch PF, but without yeilding the preferred properties, include water soluble thickening polymers such as polyvinyl alcohol (Gelvato 20–30, a grade commonly used in modifying concrete and plaster), hydroxyethyl cellulose (Cellosize QP 4400, a grade commonly used in modifying paints and plaster), a maleic acid copolymer (Gantrez AN, a common water soluble binder and thickener). A variant of the Carbowax 6000 polyoxyethylene polymer which has utility in the present invention is Polyox WSRN 10. Carbowax 4000 is equivalent to Carbowax 6000 when the investment is manufactured, stored and used at temperatures below 35°C.

The foregoing materials, while not functioning as well as the preferred composition disclosed herein for specific uses such as dental investment material, are functional to produce the friable product exhibiting a strength under compression of less than about 500 pounds. Likewise, the use of other so-called water soluble starches did not promote the softness and water retention preferred in the investment and did not mix as uniformly as the cornstarch or potato starch. In formulating the modified gypsum product of the present invention, the cornstrach is preferably used at a concentration of approximately 9% (8.7%) and depending upon the properties desired in the investment can be used in an amount from about 3 to about 15% by weight of the composition.

The diatomaceous earth used in the composition was found to be functional at concentrations of from about 5 to about 20% by weight of the total composition. Functionally, the amount required is related to the water holding capacity of the diatomaceous earth selected and the composition is adjusted accordingly to obtain the properties desired for each end use. Too little of the diatomaceous earth does not permit enough water to be used in the composition to extend and soften the mixture. Too much diatomaceous earth promotes erosion of the gypsum investment when it is soaked in water as shown in the examples and also promotes too friable an investment, i.e., fracture strengths too low for utility in some applications.

The product of the present invention, in its preferred form, may be described as a microscopically foraminous solid having a fracture strength under compression of from between about 100psi to about 500psi comprising uniformly distributed therethrough about 30 to 45% by weight of the substantially completely hydrated calcined gypsum, about 30 to 55% by weight of chemically uncombined water, about 5 to 20% by weight of an extender capable of maintaining the chemically uncombined water evenly distributed throughout the solid, and about 3 to 10% by weight of a water swollen glutinous organic binder capable of enhancing the adherence of the hydrated gypsum to the extender.

The gypsum material used to make up the composition of the present invention can be the alpha form of calcined gypsum, or it can be mixtures of the alpha and beta forms, for example, the product, Castone (manufactured by The Ransom and Randolph Division of Dentsply International Inc.), has utility in making the formulations of the present invention.

When using a product such as Castone, a typical formulation would comprise 100 parts by weight of Castone, 1 part by weight of Carbowax 6000, 0.1 part by weight of an anionic surfactant, 0.1 part by weight of a silicone surfactant, 0.01 parts by weight of an antifoam agent, 0.1 part by weight of a fragrance agent and 0.5 part by weight of Ultramarine Blue pigment to make up a total of 101.75 parts by weight.

Compositions formulated using Castone produced somewhat higher strength under compression than straight plaster of paris. However, a smooth uniform casting with excellent detail reproduction capability was obtained.

Other materials can be substituted where compatible with the basic materials producing the unobvious results of the present invention. For example, other surface active agents either anionic, nonionic or cationic may be used where they are compatible and produce the appropriate results in the final investment composition. Selections of the non-critical materials is a matter of choice and forms no part of the present invention.

While no minimum fracture strength has been stated herein it is contemplated that compositions should be formulated so that sufficient rigidity is present in the set product to permit handling as described herein and permit faithful reproduction of the details in the material being invested. It is believed that the preferred compositions would therefore have a fracture strength under compression of at least 100 psi.

This invention has been described with reference to specific embodiments thereof which produce the desired results. Other materials may be substituted for the materials disclosed and amounts may be altered at the choosing of the formulator in order to achieve various additional attributes which it would be within the knowledge of one skilled in the art to obtain using a gypsum base material such as disclosed herein.

What is claimed is:

1. A microscopically foraminous solid dental molding composition having a fracture strength under compression of from between about 100psi to about 500psi comprising uniformly distributed therethrough about 30 to 45% by weight of a substantially completely hydrated calcined gypsum, about 30 to 55% by weight of chemically uncombined water, about 5 to 20% by weight of an extender capable of maintaining the chemically uncombined water evenly distributed throughout the solid, wherein said extender is selected from the group consisting of diatomaceous earth or perlite; and about 3 to 10% by weight of a water swollen glutinous organic binder capable of enhancing the adherence of the hydrated gypsum to the extender.

2. The invention of claim 1 wherein the binder is cornstarch or carboxymethyl cellulose.

* * * * *